United States Patent [19]

Inbar et al.

[11] Patent Number: 5,491,332
[45] Date of Patent: Feb. 13, 1996

[54] TRANSPARENCY VIEWING APPARATUS HAVING DISPLAY AND MASKING FUNCTIONS

[75] Inventors: Dan Inbar; Giora J. Teltsch, both of Haifa, Israel

[73] Assignee: A.D.P. Adaptive Visual Perception Ltd., Haifa, Israel

[21] Appl. No.: 175,372

[22] PCT Filed: Jun. 28, 1994

[86] PCT No.: PCT/EP91/01310

§ 371 Date: Apr. 4, 1994

§ 102(e) Date: Apr. 4, 1994

[87] PCT Pub. No.: WO93/01564

PCT Pub. Date: Jan. 21, 1993

[51] Int. Cl.[6] .............. G06K 11/08; G02B 27/02
[52] U.S. Cl. ........................... 250/221; 382/212
[58] Field of Search ................. 250/221, 222.1, 250/216; 382/6, 31, 32, 54

[56] References Cited

U.S. PATENT DOCUMENTS 4,908,876  3/1990  DeForest et al. .................. 382/54
4,977,315 12/1990 Purcell .......................... 250/221

FOREIGN PATENT DOCUMENTS 0165548 12/1985 European Pat. Off. .
0436267  7/1991 European Pat. Off. .
3331762  3/1985 Germany .
9010889  1/1991 Germany .

*Primary Examiner*—Edward P. Westin
*Assistant Examiner*—John R. Lee
*Attorney, Agent, or Firm*—Sandler, Greenblum & Bernstein

[57] ABSTRACT

Apparatus having the dual function of display and optical mapping of transparencies which includes a viewing surface to which a transparency is adjacent, a segmented surface underlying the viewing surface and having a plurality of segments at least two of which have a controllable opacity, at least one photodetector underlying the segmented surface which detects light passing through the viewing surface and the segmented surface and generates detected light signals responsive to the intensity of the detected light and a mapping system which, in an opacity determination mode, sequentially varies of the opacity of selected segments and which determines the opacity of portions of the transparency based on signals supplied during such sequential variation.

43 Claims, 4 Drawing Sheets

TRANSPARENCY VIEWING APPARATUS HAVING DISPLAY AND MASKING FUNCTIONS

RELATED APPLICATIONS

This application is a National Application based on PCT application number PCT/EP91/01310 filed Nov. 7, 1991.

FIELD OF THE INVENTION

This invention relates to display apparatus including optical mapping and more specifically to apparatus combining display and mapping functions.

BACKGROUND OF THE INVENTION

Flat panel displays such as liquid crystal displays (LCD) are well known. Such displays are used extensively for visual display in applications such as car dashboards, instrumentation panels, household devices, sign-posts, etc. Liquid crystal arrays (LCA) are used for displays such as computer display monitors, TV monitors and projection devices. In PCT application PCT/EP91/00065 liquid crystal devices are proposed for use in an improved transparency viewing apparatus.

The general need for improved human interfaces in the direct activation of apparatus is well known, and various types of touch screens are available. Such touch screens include apparatus based on infra-red detection and on piezo-electric, ultrasonic, resistive and other technologies.

Known combinations of flat panel displays and touch screens suffer from disadvantages of bulkiness, complexity and high cost resulting from the need to provide two separate systems, one for display and another for detection.

SUMMARY OF THE INVENTION

In general terms the invention comprises a display device which includes a mapping function.

The display device, in one preferred embodiment of the invention, is a light box operative to provide enhanced illumination and/or masking of a transparency. In a second embodiment of the invention the display device is capable of displaying variable information on a viewing surface. Examples of such devices are a TV monitor or a PC monitor. In a third embodiment of the invention the display device is a non-matrix type display such a dashboard display or other display having fixed indications in particular places which can be turned on or off.

The display device can comprise, for example, an LCD (liquid crystal display), an LCA (a liquid crystal array) or a video or PC display utilizing an LCA.

The mapping function is performed, in a preferred embodiment of the invention, by selectively varying the opacity of segments of the viewing surface and by measuring the amount of light which is transmitted through the segments. When the display device is a light box comprising an LCA and back-lighting, the opacity of segments of the array is varied to determine the loci of the transparency and/or the opacity of portions of transparency overlying the segments. When the display device is a TV or computer monitor utilizing an LCA, the segments of the LCA can be sequentially made transparent in order to determine the position of the shadow of a finger or other pointer. Where the display device is an enunciator using an LCD, optical detection of a finger can be used to perform command functions associated with particular segments of the display.

The mapping function can utilize a segmented surface such as an LCA which is additional to the display part of the apparatus. In a preferred embodiment of the invention, both the display and mapping functions are performed using the same LCA.

Thus it is an object of some aspects of the present invention to provide an improved apparatus for viewing transparencies and the like which is automatically self masking.

It is an object of some aspects of the invention to provide a video monitor or other display device having improved, optically based "touch" screen functions.

There is therefore provided in accordance with a preferred embodiment of the invention display apparatus having the dual function of display and optical mapping of objects including a viewing surface to which the object is adjacent, a segmented surface underlying the viewing surface and having a plurality of segments at least two of which have a controllable opacity, control apparatus for selectively varying the opacity of at least two of the segments and light detection apparatus for detecting light passing through the viewing surface and the segmented surface and for supplying signals responsive to the intensity of the detected light. The dual function apparatus includes mapping apparatus operative, in an opacity determination mode, for sequential variation of the opacity of the at least two segments and for determination of the opacity of portions of the object based on the signals.

The object may be a pointer such as a finger or it may be a transparency.

In a preferred embodiment of the invention the display apparatus also includes apparatus underlying the segmented surface for back-lighting the viewing surface. This back-lighting may be turned off during the opacity determination or compensation may be provided for the back-lighting.

The light detection apparatus may underlie the segmented surface or may be external to the viewing surface. When the light detection apparatus underlies the segmented surface the viewing surface is preferably externally illuminated.

In a preferred embodiment of the invention the mapping apparatus is operative in a reference determination mode in the absence of the object for determination of a reference signal by varying the opacity of at least one of the at least two segments, wherein, when the mapping means is operating in the opacity determination mode, the detected signals are divided by respective ones of the so-determined reference signals.

Preferably the segmented surface includes a liquid crystal array.

In a preferred embodiment of the invention the mapping apparatus is operative to determine the loci of the object and/or the relative opacity of portions of the object.

The light detecting apparatus preferably includes one or more photodetectors.

The sequential variation may include variation of single ones of the segments or groups of them which may include rows and columns of segments. The opacity may be sequentially varied in non-adjacent rows and columns to more quickly determine the approximate position of the object.

In a preferred embodiment of the invention the viewing surface includes an LCA monitor, a video display or an LCD display.

In a preferred embodiment of the invention the mapping apparatus is operative in a viewing mode, to selectively vary the opacity of the at least two segments in response to the determination of opacity, thereby to at least partially compensate for variations of opacity of the object. In the opacity determination mode the mapping apparatus is then adapted to determine the relative optical density of portions of the object. Alternatively a substantially constant illumination may be provided within the confines of the object.

When the object is a transparency the mapping means is operative in the viewing mode for providing substantially constant or no illumination of the viewing surface outside the borders of the object.

In a preferred embodiment of the invention the display apparatus also includes a projection lens for projecting an image of the viewing surface onto a projection surface.

BRIEF DESCRIPTION OF THE DRAWINGS

For a better understanding of the invention with respect to the embodiments thereof, reference is made to the accompanying drawings, in which like numerals designate corresponding sections or elements throughout, and in which.

DETAILED DESCRIPTION OF THE PREFERRED EMBODIMENTS

Figure 1:
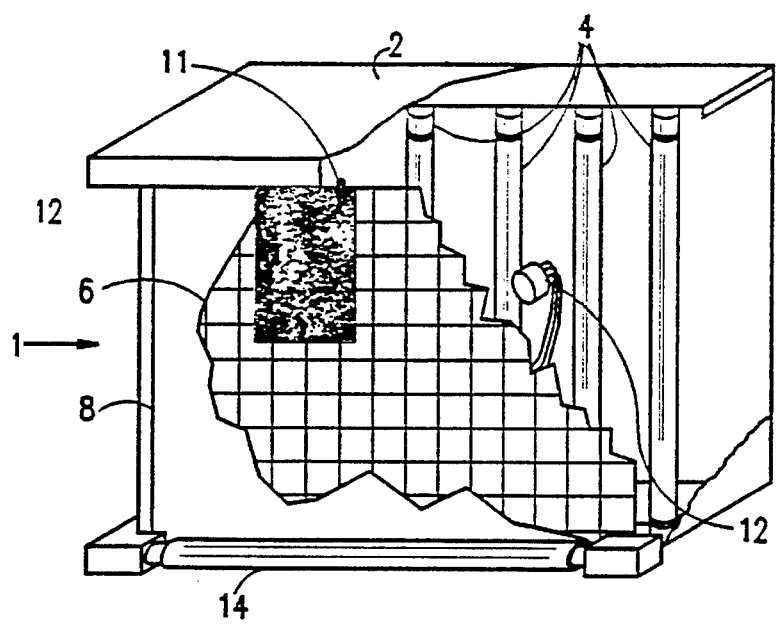
FIG. 1 is a perspective, partially cut-away view of a viewing box in accordance with a preferred embodiment of the invention.

FIG. 1 shows a viewing device 1 for viewing transparencies, which is commonly known as a "light box". The light box includes a housing 2, forming five sides of a rectangular box and preferably made of a light opaque material. Placed within the light box is series of light sources 4, for example a row of fluorescent lights. Covering the sixth side of housing 2 is a segmented surface 6 having a plurality of segments with independently controllable opacity, for example a Liquid Crystal Array (LEA). LCA 6 is preferably covered by a translucent diffusing material forming a viewing surface 8. A transparency 10 is shown mounted on the viewing surface and is held in place by a film holder 11. In FIG. 1 the segments are shown having a relatively large size for clarity. In general the segment size is small compared to the size of the transparency.

Alternatively, viewing surface 8 may be the outer surface of LCA 6. In an alternative embodiment of the invention LCA 6 is made of a diffusing material or a diffusing material underlies the LCA. Placed within viewing device 1, and underlying (i.e., interior to) LCA 6 are one or more photo-detectors 12, for sensing light passing through viewing surface 8 and LCA 6.

Outside housing 2 and near the bottom of viewing surface 8 is an additional light source 14, such as a fluorescent light. Additionally or alternatively a light source (not shown) is placed near the top of the housing. Alternatively, external light sources are not present as part of the viewing device and ambient room light is used as the source of light for carrying out the invention as described below.

In PCT Application PCT/EP91/00065, the disclosure of which is incorporated herein by reference, the present inventors describe a light box which is of the same general construction as the viewer of FIG. 1. In that application, an LCA was used to reduce the illumination, of those portions of the viewing surface which did not contain a transparency, to some value dependent on the opacity of the transparency or to zero. In one embodiment of the invention disclosed in the above mentioned application, the opacity of portions of the transparency are measured off-line and opacity of the elements of the LCA underlying the transparency are adjusted to give a fairly uniform viewing brightness, compensating for relatively dark and light portions of the transparency.

In one aspect of the present invention, the loci of the transparency and/or of the relative opacity of portions of the transparency are determined automatically while the transparency is mounted on viewing surface 8. Viewing device 1 is therefore provided with mapping apparatus 16, shown more clearly in FIG. 2, which operates in a number of modes. In a opacity determination mode, mapping apparatus 20 determines at least the loci (i.e., the extent) of transparency 10 and preferably also the relative opacity of different portions of transparency 10.

Figure 2:
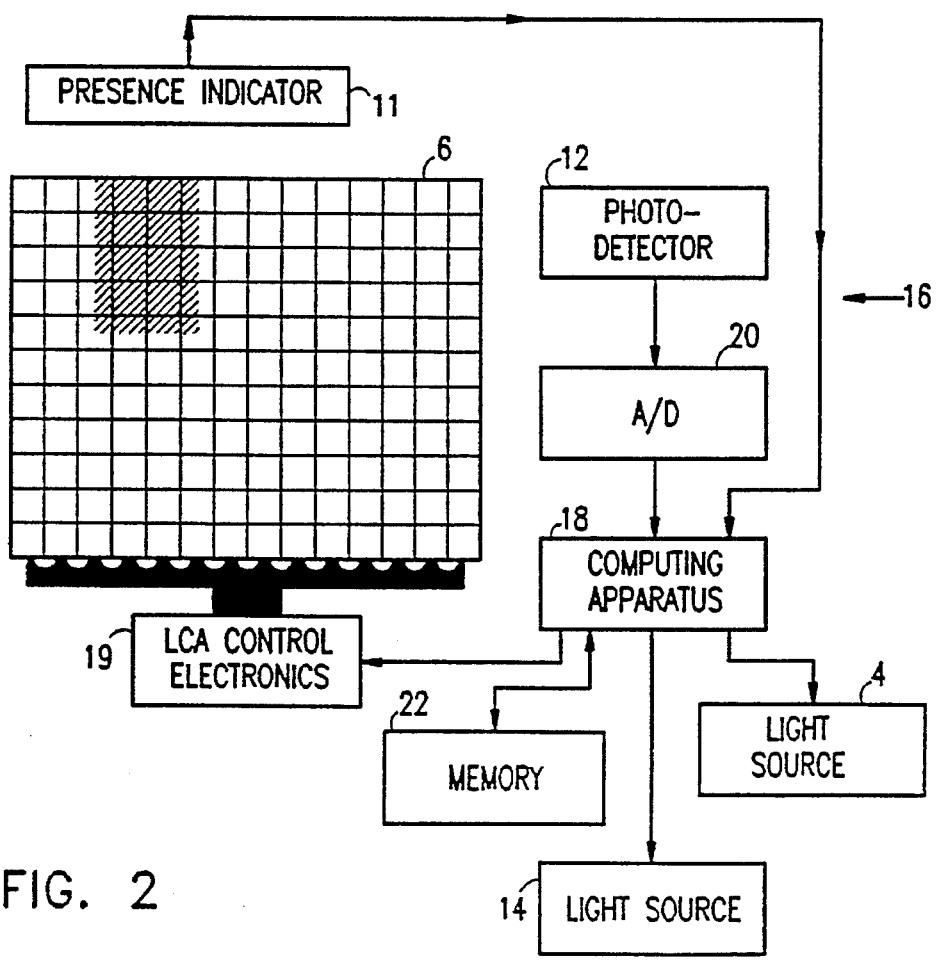
FIG. 2 is a block diagram of the electronics and segmented LCA of the embodiment of FIG. 1.

As shown in FIG. 2 mapping apparatus 16 includes computing apparatus 18, which may be for example a microprocessor, which acts as its central control. In the aforementioned opacity determination mode, computing apparatus 18 is operative to turn on light source 14. During this mode of operation most of the segments of the LCA are opaque and the computing apparatus is operative to cause LCA electronics 19 to sequentially "turn on" (i.e., make transparent) selected segments of LCA 6. As each of these segments (or groups of segments) is made transparent, some light from source 14 is transmitted through surface 8 and the transparent segment of LCA 6. This light is diffused and some of it impinges on detector 12 causing it to supply a detected light signal to analog to digital convertor (A/D) 20. A/D 20 digitizes the detected light signal and supplies the digitized signal to computing apparatus 18.

The amount of light reaching detector 12 depends on which segment is turned on, how many segments are turned on and on the presence or absence of a transparency overlying that segment. Thus if a transparency does not overlay the segment, the light measured will be at some relatively high reference value. If the segment is covered then the light measured will be reduced. The amount of the reduction will depend on the amount of overlap and the density (i.e., opacity) of that portion of the transparency overlying the transparent segment.

By sequentially turning on a number of the segments it is possible to determine the position of transparency 10 and to determine the position of its edges, i.e., the loci of the transparency. Furthermore by comparing the amount of light passing through a portion of the transparency overlying one of the segments, the relative density of respective areas of the transparencies are mapped and saved in a portion of a memory 22.

These loci and transmission values can then be used as shown in the above referenced PCT application to form a mask around the transparency, for easier and better viewing and/or to compensate for the gross variations in density of the transparency by varying the amount of illumination behind the different portions of the transparency. This masking function and the flattening of the field are described more fully in the above referenced PCT application.

In a preferred embodiment of the invention film holder 11 acts as an indicator of the presence and general position of the transparency. For example the holder may include a micro-switch which indicates to computing apparatus 18 that the transparency has been mounted and its approximate position. In this embodiment of the invention, computing apparatus 18 will cause the LCA segments to be turned on in rows and columns in a sequence which will minimize the search time for the loci. In such a sequence, alternate or every third (or greater) column will be turned on, starting at the position indicator, until an indication is received that the column in question is outside the region of the transparency. Then intermediate columns will be turned on to localize the locus. This process will be repeated for the other side of the transparency. The bottom of the transparency is found with a similar search using rows.

In a preferred embodiment of the invention, light source 4 is turned off while mapping apparatus 16 is in the opacity determination mode. In an alternative embodiment, light source 4 is on and is light from this source is compensated for as described below.

Periodically, when there is no transparency in the viewer, the mapping apparatus is operative to determine the reference value of the detected light signal for each of the segments. In this mode each of the segments is opened and the value of the detected light signal is recorded in memory 22. The values found during this procedure represent the amount of light passing through the segment when it is not covered by a transparency. During the opacity determination mode, the value of the detected light signal for a given open segment is compared to the reference value to determine the presence of a transparency. In order to determine the opacity of the transparency at the segment, the measured value of the detected light signal is divided by the reference value.

If light source 4 is not turned off during opacity determination, an additional correction must be made for that part of the detected light signal caused by light source 4. In this case, in a background determination mode, all of the segments are turned off and the value of the resultant detected light signal is determined and stored in memory 22. During opacity determination, this value, which represents the contribution of light source 4, is subtracted from the detected light signal before it is compared with the reference value.

If light source 14 is not present, the light detected by detector 12 is derived from ambient room lighting. In this case, the procedure described above for finding the reference values must be performed fairly often in order to compensate for changing room light intensity, shadows of the operator, etc.

Figure 3:
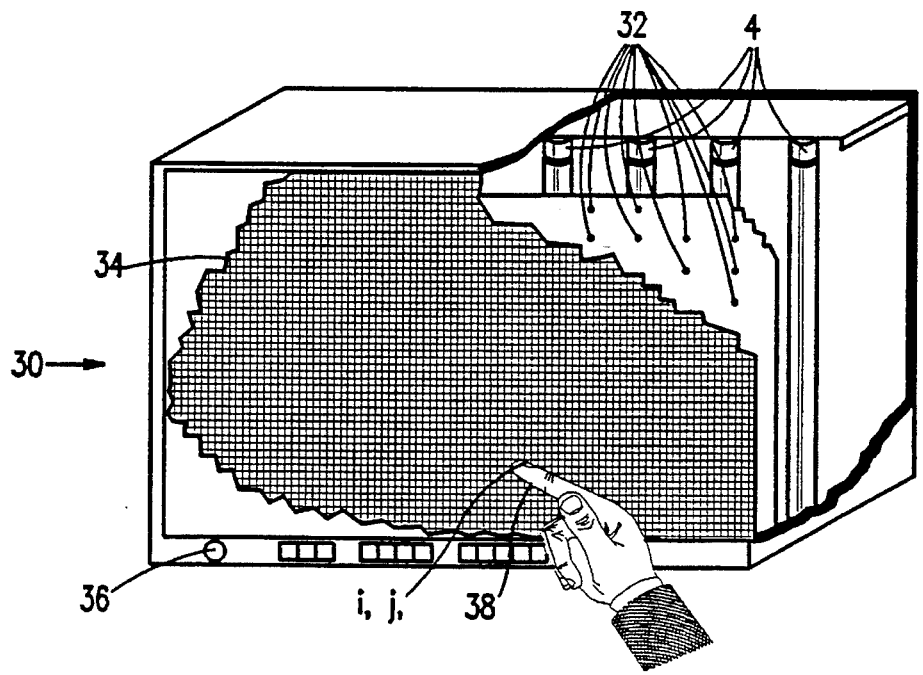
FIG. 3 is a perspective, partially cut-away view of a video display and interface system in accordance with a preferred embodiment of the invention.

FIG. 3 shows a schematic diagram of an LCD based video monitor 30 in accordance with a preferred embodiment of the invention. A plurality of photo-diodes 32 underlies a segmented LCA 34, here shown having a much smaller segment size as is suitable for a video monitor. In a preferred embodiment of the invention LCA 34 is also part of a mapping apparatus namely an optically based touch screen, which operates in parallel with the video function of the LCA.

In the embodiment of FIG. 3, light source 4 is made to pulse on and off at a high frequency, unnoticeable to the viewer. During the off periods of light source 4, LCA 34 serves as a spatially controlled optical shutter, much as in the apparatus of FIG. 1. In this case, however, the search is for a finger 38 which may be pointing at a particular part of the screen, designated as i, j.

Figure 4:
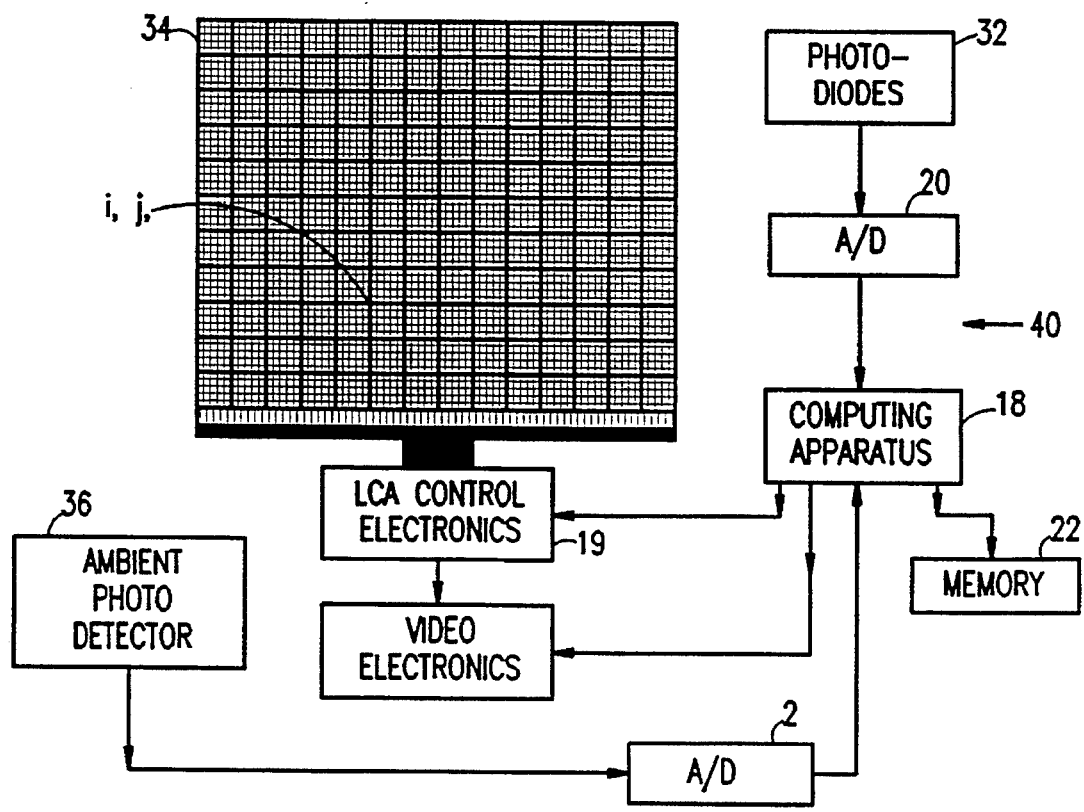
FIG. 4 is a block diagram of the electronics and segmented LCA of the embodiment of FIG. 3.

In operation, mapping apparatus 40, shown in FIG. 4, is operative to determine the presence or absence of an external indicator such as finger 38. Operation of mapping apparatus 40 is very similar to that of mapping apparatus 16 described in conjunction with FIG. 1. The main difference is in the provision of the plurality of photo-diodes 32 instead of photo-diode 12 and in the provision of an ambient light detector 36 for detecting ambient light. The digitized ambient light is compared to the light detected by the plurality of photo-diodes.

During the on-periods of light source 4, the value of light detected by photo-diodes 32 will be higher than that detected by the ambient light detector. During these periods, the detected light signals from photo-diodes 32 are ignored by computing apparatus 18. During the off periods of light source 4, the LCA is scanned and photo-diodes 32 are operative to detect a reduced light value when segments near finger 38 are open. This information can be used as in any touch screen and is especially useful for computer monitors and the like.

Figure 7:
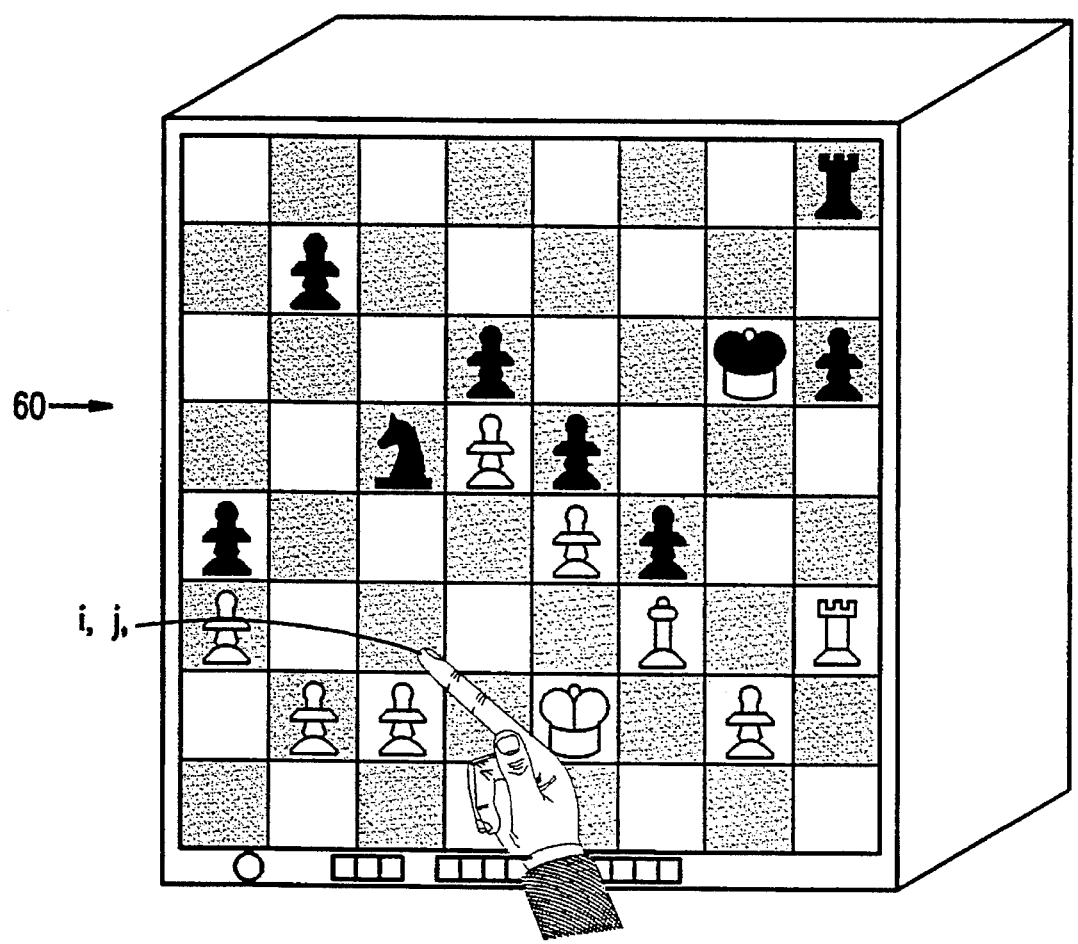
FIG. 7 is a perspective view of a universal game board in accordance with a preferred embodiment of the invention.
Figure 1:
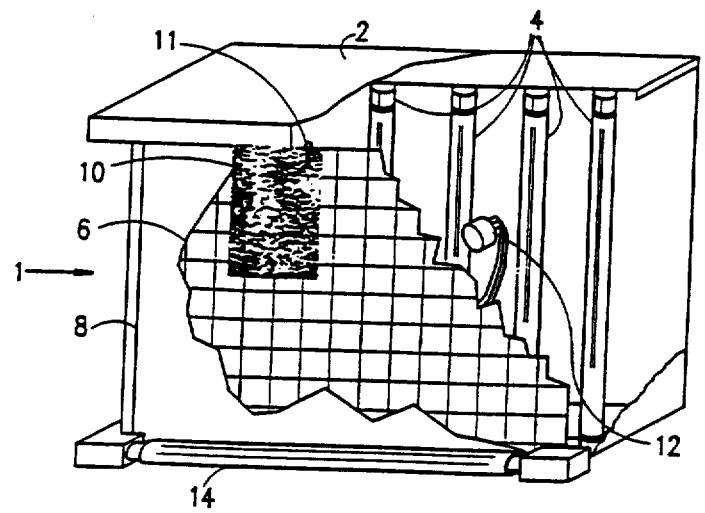
Figure 5:
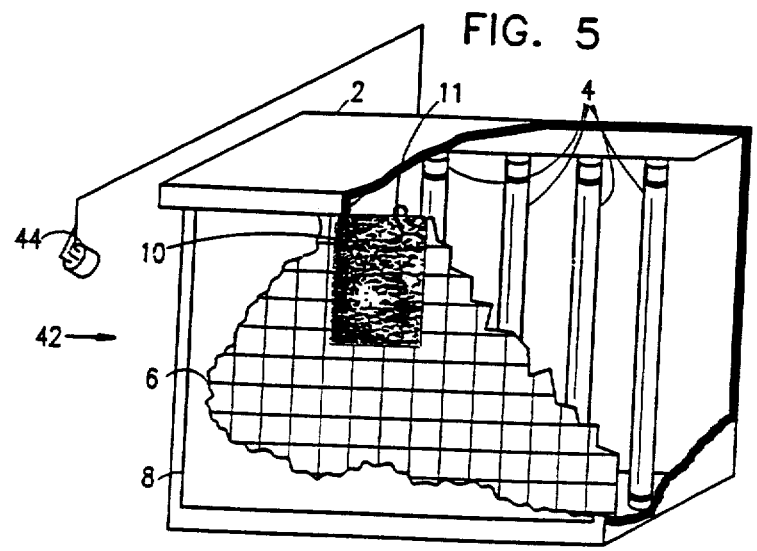

A particular application of the video monitor of the invention is a universal video game board 60 shown in FIG. 7 as a chess board. In this embodiment the video screen shows a game such as chess and the mapping apparatus determines the position of a finger, which is used for example to signal moves of the chess pieces. This board can be used for a large number of different games with the video and control functions supplied by specific software for each game.

Alternatively, the apparatus shown in FIG. 7 represents a control panel including a mapping function. In this case the squares of the display represent optical push buttons formed of LCDs, each with its own icon or message. The LCD can have the dual function of display and mapping as described above, or a separate LCA can be provided with this function.

Figure 5:
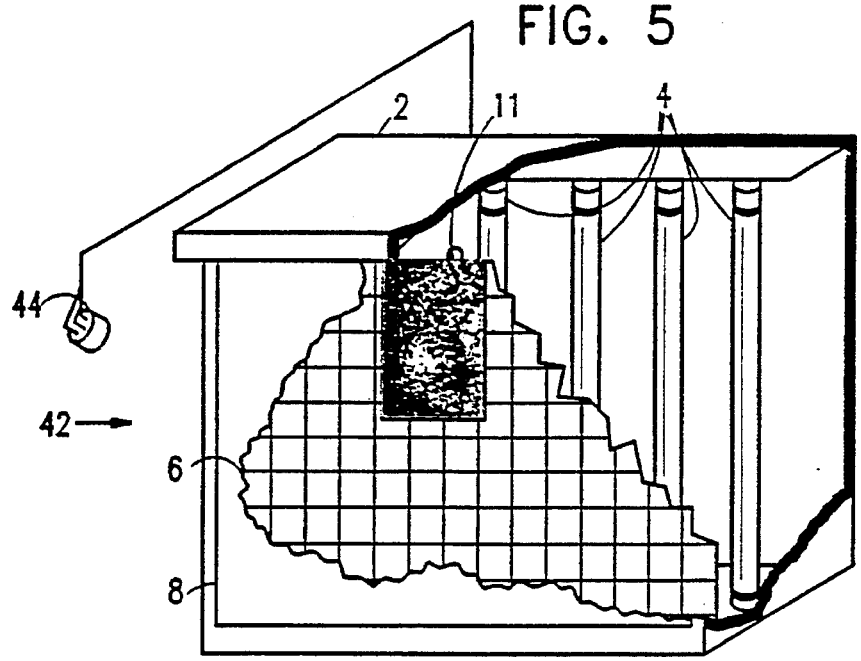
FIG. 5 is a perspective partially cut-away view of an alternative preferred embodiment of the invention.

In an alternative embodiment of the invention as shown in FIG. 5, a viewing device 42 includes a detector 44 placed outside the viewing surface. Detector 44 detects light passing through LCA and the surface. Otherwise, the viewing device operates similarly to the viewing device of FIG. 1.

Figure 6:
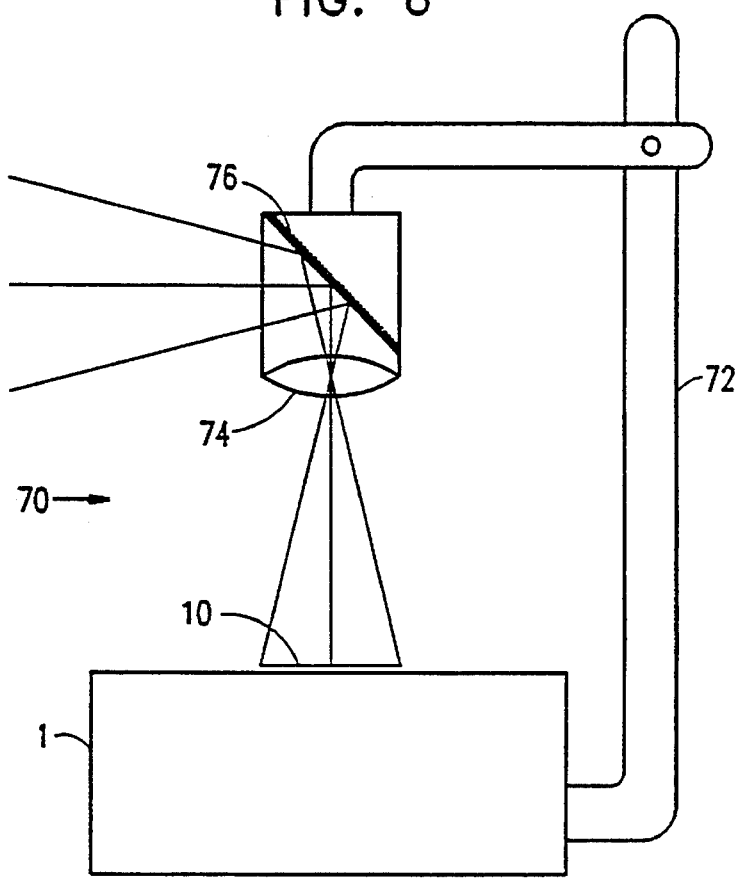
FIG. 6 is a side, schematic view of an overhead projector in accordance with a preferred embodiment of the invention.

Viewing device 1 can also, in a preferred embodiment of the invention, form part of a self-masking overhead projector 70 as shown in FIG. 6. In this embodiment of the invention, a viewing device 1 is place below a focusing lens 74 of a conventional overhead projector. Mirror 76, mounted on an arm 72, is operative to project transparency 10 onto a screen. Viewing device 1 is operative to mask the transparency to avoid the glare common when overhead projectors are used.

Although various embodiments, forms and modifications have been shown, described and illustrated above in some detail in accordance with the invention, it will be understood that the descriptions and illustrations are by way of example, and that the invention is not limited thereto but encompasses all variations and alternatives falling within the scope of the claims which follow.

We claim:

1. Apparatus having the dual function of display and optical mapping of transparencies comprising:

a viewing surface to which a transparency is adjacent;

a segmented surface underlying the viewing surface and having a plurality of segments at least two of which have a controllable opacity;

a photodetector underlying the segmented surface which detects light passing through the viewing surface and the segmented surface and generates detected light signals responsive to the intensity of the detected light, wherein the photodetector has an active area substantially smaller than the area of the viewing surface, and wherein the photodetector receives light from more than one of the plurality of segments; and a mapping system which, in an opacity determination mode, sequentially varies of the opacity of selected segments and which determines the opacity of portions of the transparency based on signals supplied during such sequential variation.

2. Apparatus according to claim 1 wherein said photodetector receives light from a viewing area substantially greater than the active area of said photodetector.

3. Apparatus according to claim 1 and comprising a diffuser which at least partially diffuses light passing through the segmented surface prior to its detection by the photodetector.

4. Apparatus according to claim 1 wherein the plurality of segments comprises an array and wherein the mapping system simultaneously varies the opacity, during said opacity determination mode, in rectangular groups of segments including a row or column of segments.

5. Apparatus according to claim 4 wherein the mapping system is operative to sequentially vary the opacity in non-adjacent elements of the array to more quickly determine the approximate position of the transparency.

6. Apparatus according to claim 4, and including a position indicator for determining the approximate position of the transparency and wherein the groups are formed by the mapping system based on the approximate position.

7. Apparatus according to claim 4 wherein the segmented surface comprises a liquid crystal array.

8. Apparatus according to claim 1, wherein the mapping system changes the opacity of groups of segments and further comprising a position indicator for determining the approximate position of the transparency, wherein the groups are formed by the mapping system based on the approximate position.

9. Apparatus according to claim 1 wherein the segmented surface comprises a liquid crystal array.

10. Apparatus according to claim 9 wherein the liquid crystal array comprises a double layer array of liquid crystal elements.

11. Apparatus according to claim 1 wherein the mapping system is operative to determine the loci of the transparency.

12. Apparatus according to claim 1 and also including an indicator which indicates a starting point for the sequential variation of the opacity when the mapping system is operating in the opacity determination mode.

13. Apparatus according to claim 12 and also including a plurality of holders which hold the transparency and wherein the indicator determines which of the plurality of holders holds the transparency and indicates the starting point in response to said determination.

14. Apparatus having the dual function of display and optical mapping of transparencies comprising:

a viewing surface to which the transparency is adjacent;

a segmented surface underlying the viewing surface and having an array of segments, a plurality of which have a controllable opacity;

a photodetector which detects light passing through the viewing surface and the segmented surface and supplies detected light signals responsive to the intensity of the detected light; and a mapping system which, in an opacity determination mode, sequentially varies selected ones of the plurality of segments including rectangular groups of segments including a row or column of segments, and determines the opacity of portions of the transparency based on signals generated during such sequential variation.

15. Apparatus according to claim 14 wherein the mapping system is operative to sequentially vary the opacity in non-adjacent rows and columns to more quickly determine the approximate position of the transparency.

16. Apparatus according to claim 14, and including a position indicator for determining the approximate position of the transparency and wherein the groups are formed by the mapping system based on the approximate position.

17. Apparatus according to claim 14 wherein the segmented surface comprises a liquid crystal array.

18. Apparatus according to claim 17 wherein the liquid crystal array comprises a double layer array of liquid crystal elements.

19. Apparatus according to claim 14 wherein the mapping system is operative to determine the loci of the transparency.

20. Apparatus according to claim 14 and also including an indicator which indicates a starting point for the sequential variation of the opacity when the mapping system is operating in the opacity determination mode.

21. Apparatus according to claim 20 and also including a plurality of holders which hold the transparency and wherein the indicator determines which of the plurality of holders holds the transparency and indicates the starting point in response to said determination.

22. Apparatus having the dual function of display and optical mapping of transparencies comprising:

a viewing surface to which a transparency is adjacent;

a segmented surface underlying the viewing surface and having a plurality of segments at least two of which have a controllable opacity;

at least one photodetector underlying the segmented surface which detects light passing through the viewing surface and the segmented surface and generates detected light signals responsive to the intensity of the detected light; and a mapping system which, in an opacity determination mode, sequentially varies of the opacity of selected segments and which determines the opacity of portions of the transparency based on signals supplied during such sequential variation.

23. Apparatus according to claim 22 wherein the at least one photodetector comprises a single photodetector.

24. Apparatus according to claim 22 wherein said photodetector receives light from a viewing area substantially greater than the active area of said photodetector.

25. Apparatus according to claim 22 and comprising a diffuser which at least partially diffuses light passing through the segmented surface prior to its detection by the photodetector.

26. Apparatus according to claim 22 wherein the plurality of segments comprises an array and wherein the mapping system simultaneously varies the opacity, during said opacity determination mode, in rectangular groups of segments including a row or column of segments.

27. Apparatus according to claim 26 wherein the mapping system is operative to sequentially vary the opacity in non-adjacent elements of the array to more quickly determine the approximate position of the transparency.

28. Apparatus according to claim 26, and including a position indicator for determining the approximate position of the transparency and wherein the groups are formed by the mapping system based on the approximate position.

29. Apparatus according to claim 22, wherein the mapping system changes the opacity of groups of segments and further comprising a position indicator for determining the approximate position of the transparency, wherein the groups are formed by the mapping system based on the approximate position.

30. Apparatus according to claim 22 wherein the segmented surface comprises a liquid crystal array.

31. Apparatus according to claim 30 wherein the liquid crystal array comprises a double layer array of liquid crystal elements.

32. Apparatus according to claim 22 wherein the mapping system is operative to determine the loci of the transparency.

33. Apparatus according to claim 22 and also including an indicator which indicates a starting point for the sequential variation of the opacity when the mapping system is operating in the opacity determination mode.

34. Apparatus according to claim 33 and also including a plurality of holders which hold the transparency and wherein the indicator determines which of the plurality of holders holds the transparency and indicates the starting point in response to said determination.

35. Apparatus having the dual function of display and optical mapping of transparencies comprising:

a viewing surface to which the transparency is adjacent;

a segmented surface underlying the viewing surface and having an array of segments, a plurality of which have a controllable opacity;

a photodetector which detects light passing through the viewing surface and the segmented surface and supplies detected light signals responsive to the intensity of the detected light; and a mapping system which, in an opacity determination mode, sequentially varies selected ones of the plurality of segments in groups of segments and determines the opacity of portions of the transparency based on signals generated during such sequential variation.

36. Apparatus according to claim 35 wherein the groups of segments include at least one row or one column of elements.

37. Apparatus according to claim 36 wherein the mapping system is operative to sequentially vary the opacity in non-adjacent rows and columns to more quickly determine the approximate position of the transparency.

38. Apparatus according to claim 36 and also including an indicator which indicates a starting point for the sequential variation of the opacity when the mapping system is operating in the opacity determination mode.

39. Apparatus according to claim 38 and also including a plurality of holders which hold the transparency and wherein the indicator determines which of the plurality of holders holds the transparency and indicates the starting point in response to said determination.

40. Apparatus according to claim 35, and including a position indicator for determining the approximate position of the transparency and wherein the groups are formed by the mapping system based on the approximate position.

41. Apparatus according to claim 35 wherein the segmented surface comprises a liquid crystal array.

42. Apparatus according to claim 41 wherein the liquid crystal array comprises a double layer array of liquid crystal elements.

43. Apparatus according to claim 35 wherein the mapping system is operative to determine the loci of the transparency.

* * * * *

UNITED STATES PATENT AND TRADEMARK OFFICE
CERTIFICATE OF CORRECTION

PATENT NO. : 5,491,332

DATED : February 13, 1996

INVENTOR(S) : D. INBAR et al.

It is certified that error appears in the above-indentified patent and that said Letters Patent is hereby corrected as shown below:

On the title page, item [22] "PCT Filed", change "Jun. 28, 1994" to ---Jul. 11, 1991---.

On the title page, item [86], "§ 371 Date", change "Apr. 4, 1994" to ---Mar. 31, 1994---.

On the title page, item [86], " § 102(e) Date", change "Apr. 4, 1994" to ---Mar. 31, 1994---.

On the title page, item [57], "ABSTRACT", line 11, delete "of" (first occurrence).

At column 3, line 54, change "(LEA)." to ---(LCA)---.

At column 4, line 27, "a" should be changed to ---an ---.

At column 4, line 28, "20" should be changed to ---16---.

UNITED STATES PATENT AND TRADEMARK OFFICE
CERTIFICATE OF CORRECTION

PATENT NO. : 5,491,332
DATED : February 13, 1996
INVENTOR(S) : D. INBAR et al.

It is certified that error appears in the above-indentified patent and that said Letters Patent is hereby corrected as shown below:

At column 4, line 64, change "transparencies" to ---transparency---.

At column 5, line 26, delete "is" (second occurrence).

At column 6, line 43, after "through" insert ---the---.

At column 6, line 48, change "place" to ---placed---.

At column 7, line 48 (claim 1, line 16), delete "of" (first occurrence).

At column 8, line 42 (claim 22, line 13), delete "of" (first occurrence).

In the drawings, Figs. 1 and 5, add reference numeral 10, and in Fig. 1 delete floating reference numeral 12, as illustrated in the attached two sheets of drawings.

Signed and Sealed this

Nineteenth Day of November, 1996

Attest:

BRUCE LEHMAN

Attesting Officer          Commissioner of Patents and Trademarks